July 18, 1967          H. F. DATES ETAL          3,331,702
IRIDIZING METHOD
Filed May 28, 1963
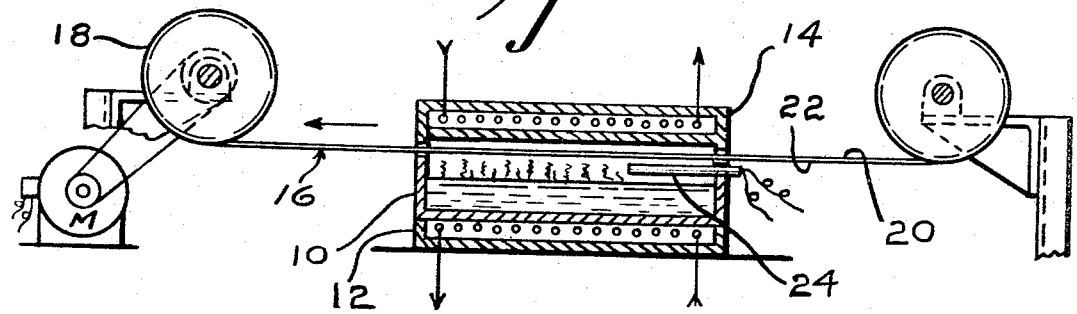
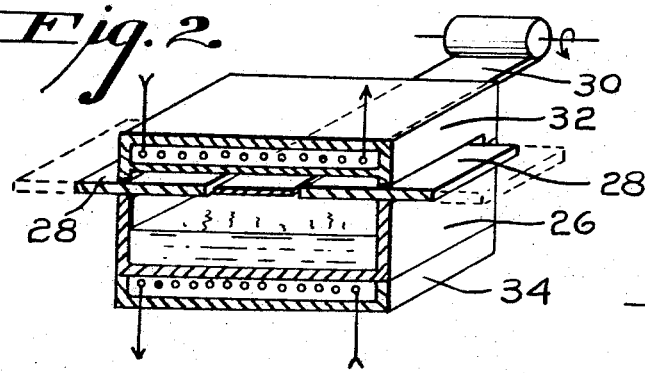
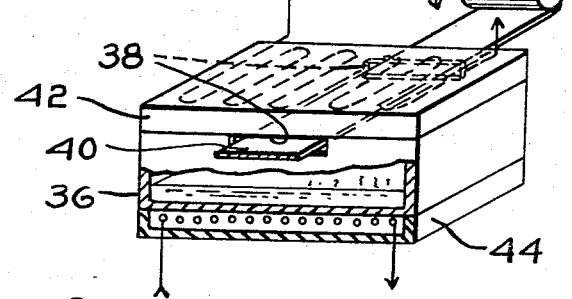
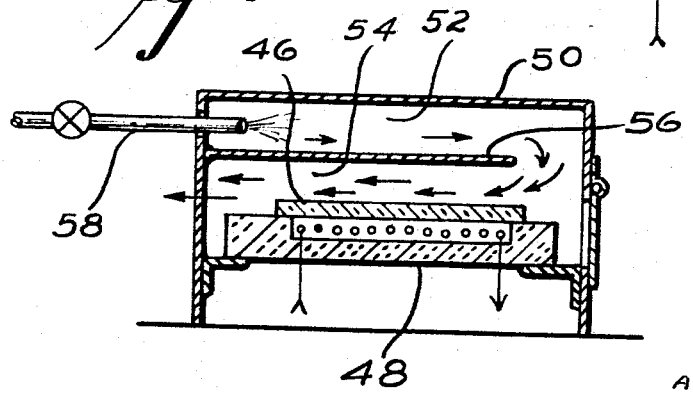
INVENTORS
HAROLD F. DATES
AND JAMES K. DAVIS
BY Clarence R. Patty Jr.
ATTORNEY United States Patent Office 3,331,702
Patented July 18, 1967

3,331,702
IRIDIZING METHOD
Harold F. Dates and James K. Davis, Corning, N.Y.,
assignors to Corning Glass Works, Corning, N.Y., a
corporation of New York
Filed May 28, 1963, Ser. No. 285,193
6 Claims. (Cl. 117—211)

This application is a continuation-in-part of our prior application S.N. 633,094 filed Jan. 8, 1957, now abandoned.

This invention relates to the production of iridized metal oxide films on supporting bases or substrates having an inherently low heat capacity, such as glass fiber cloth and thin flexible glass ribbons or sheets. It is of particular value in producing electrically conducting films on such substrates.

The iridizing process has long been known as a means of decorating glassware and other ceramic materials. More recently it has been adapted to the formation of electrically conducting films on such articles as deicing windshields, heater panels, heated fluid conductors, and electrical resistors. In general the process involves heating a refractory base material, such as a sheet of glass, to a temperature of 500° to 700° C. and exposing a surface of the heated body to a metal salt which decomposes under the influence of the heated surface to form a continuous, adherent, metal oxide film thereon. In accordance with conventional practice, the filming material, in the form of vapors or an atomized solution, is forcibly carried against the heated surface to be coated by a stream of air. Alternatively the heated body may be immersed in the coating material momentarily.

Iridized, metal oxide films may be formed from a wide variety of metal salts. Suitable materials and mixtures for producing electrically conducting films of this nature include the chlorides, bromides, iodides, sulfates, nitrates, oxalates, and acetates of tin, indium, cadminum, tin and antimony, tin and indium, or tin and cadmium either with or without a similar hydrolyzable salt or other compound of a modifying metal such as zinc, iron, copper, or chromium. The film consists of the corresponding metal oxide or oxides. For a clearer understanding of such films, their formation and their characteristics, reference is made to United States Patents Nos. 2,564,706 and 2,564,707 issued in the name of John M. Mochel.

However, attempts to utilize these previously known methods in iridizing thin flexible materials, such as glass fiber cloth or thin glass ribbons or sheets having a thickness of 30 mils or less, have been essentially unsuccessful. We have now found that a basic difficulty has been failure to maintain the substrate, and particularly its exposed surface, at an adequate temperature during the period of time required for film formation.

As is well known, the iridizing process requires a minimum substrate temperature on the order of 400°–450° C. Even at this temperature film continuity and adherence are generally poor, and the resistance of an electrically conducting film thus formed tends to be abnormally high and very unstable. As a result temperatures of 600°–700° C. have usually been considered optimum for forming this type of film.

However, most commercially available glass fiber materials tend to partially coalesce and become brittle when exposed to temperatures above about 550° C. Also thin glass sheets or ribbons, when heated to these temperatures tend to soften sufficiently so that they buckle or otherwise distort even under the relatively low pressures which may be experienced from the impact of a spray solution. Thus in iridizing such thin flexible materials it is generally desirable to heat such materials to a temperature on the order of 550° C. but not higher.

Our present findings indicate that the heat capacity of a thin vitreous substrate, i.e. one not exceeding 30 mils in thickness, is so inherently low that direct impact of a cold, film-forming material on its surface almost instantly reduces the temperature to such an extent that nonuniform film formation occurs. Necessarily then, conventional iridizing methods, which involve direct pressure application to a substrate surface, have failed to produce on such thin substrates metal oxide films having substantially uniform physical and electrical characteristics. Conversely, prior success in iridizing articles having a thickness of at least several millimeters has been due to the inherently larger reservoir of heat in such bodies preventing any significant temperature drop during the short time required for film formation.

We have further found that the formation of electrically conducting films having a reasonable degree of electrical stability and uniformity of resistance requires substantially uniform coating conditions over the surface, including substrate temperature. However, even the iridizing process itself extracts heat from the substrate. Thus we find it necessary, not only to minimize external influences, but to uniformly expose the material being filmed so that the heat loss is evenly distributed and thus easily compensated for.

In U.S. Patent No. 2,522,531 the problem of iridizing thin materials is recognized and it is proposed, as a solution, to float the materials on a bath of molten metal while they are being sprayed. While this process can be successfully carried out, it is rather tedious and expensive at best, and is obviously restricted to relatively small pieces of material.

Numerous potential commercial applications exists for iridized articles of this nature. There is then a distinct need for a simpler and more generally applicable method of successfully iridizing substrates having a thickness of 30 mils or less, and hence an inherently low heat capacity. It is a primary purpose of this invention to provide a novel method for meeting this need.

It is a further purpose to provide for the production of iridized, metal oxide coatings or films on such low heat capacity substrates without distorting or otherwise injuring the substrate.

A further and more specific purpose is to provide iridized, electrically conducting, metal oxide coatings, which have relatively stable and consistent electrical resistances, on thin glass or other smooth surfaced refractory materials as well as on cloth woven from glass or other inorganic fibers, and to provide for producing such films on continuous lengths of such materials.

The manner in which these and other purposes are accomplished by the present invention will be better understood from the following description taken in conjunction with the drawings in which, FIG. 1 is a longitudinal sectional view illustrating continuous coating of glass fiber cloth in accordance with the present invention, FIGS. 2 and 3 are perspective views partly in section illustrating modified coating units for use in the process of FIG. 1, and FIG. 4 is a longitudinal sectional view illustrating coating of a thin sheet of glass in accordance with a modified form of the invention.

In general the present invention relates to a method of producing an iridized metal oxide film on a vitreous substrate having a thickness not exceeding about 30 mils which comprises forming within a confined space an atmosphere of quiescent vapors containing at least one metal salt capable of decomposing in the presence of a heated surface and depositing on each surface a metal oxide corresponding to the metal salt, heating the substrate to a predetermined coating temperature at which the metal salt decomposes to deposit the metal oxide, bringing the decomposible vapors into contact with the heated substrate by thermal convection currents generated within the confined atmosphere, thereby forming a metal oxide film of substantially uniform physical and electrical characteristics on the exposed substrate surface, and supplying heat to the opposite surface of the substrate in an amount sufficient to compensate for the heat loss due to the formation of the metal oxide film, thereby maintaining the substrate at a substantially constant temperature.

The coating temperature to be employed will generally be at least 500° C. since, as indicated above, it is difficult to produce a useful film below that temperature. Where an electrically conducting film is desired, it is preferable to employ temperatures of at least 550° C., and even higher temperatures if the nature of the base material is such that it will not be injured by such higher temperatures.

The present invention is not concerned with specific coating compositions and contemplates the use of any materials known for iridizing purposes. Where electrically conducting films are desired, there are, as recited above, a wide variety of metal salts and mixtures of such salts that may be employed. In general tin oxide films containing on the order of 1% antimony oxide as the modifier provide optimum electrical characteristics and are preferred. However, as described in the previously referred to Mochel patents, larger amounts of antimony oxide up to about 15% are satisfactory for producing conducting films and the films may be produced for mixtures of tin and antimony salts such as the chlorides.

For purposes of illustration only, the invention will be described with relation to use of such mixtures. Thus liquid antimony pentachloride ($SbCl_5$) may be dissolved directly in liquid anhydrous stannic tetrachloride ($SnCl_4$) and the mixture volatilized to form an atmosphere of quiescent fumes composed of a mixture of these chlorides. Alternatively a mixture of stannic tetrachloride pentahydrate ($SnCl_4 \cdot 5H_2O$) and antimony trichloride ($SbCl_3$) may be volatilized to form the coating atmosphere. For the purposes of the present invention the term "quiescent fumes" refers to an atmosphere, composed essentially of volatilized metal salts or atomized solutions thereof useful for iridizing purposes, which is brought into operative relationship with a surface to be iridized by thermal convection currents generated within the atmosphere rather than by an external force such as applied air current or other pressure means such as used in spraying techniques. The term "iridizing," as here used, has the conventional meaning set forth earlier.

Referring now to the drawings, FIG. 1 illustrates coating of a wide roll of glass fiber cloth and apparatus for that purpose. A shallow rectangular container 10, in the nature of a trough, is partially filled with a mixture of antimony and tin chlorides. A hot plate 12 supplies heat to container 10 for the purpose of volatilizing the chloride mixture and forming within the container a confined atmosphere of quiescent fumes for coating purposes. A rectangular heater 14, which may be a conventional heater unit with wire coils, is positioned above the open mouth of container 10 and, as shown, slightly spaced therefrom. A roll of glass fiber cloth 16 is passed between the container 10 and heating element 14 and rewound on roller 18. It will be understood that cloth 16 will be drawn through the coating apparatus and wound on roller 18 by conventional means for this purpose which form no part of the present invention and hence are shown schematically. As glass cloth 16 is drawn through the coating apparatus its upper surface 20 is exposed to radiant heat from heater 14 to heat the cloth to, and maintain it at, a selected coating temperature of for example 500° C. The under surface 22 of the glass cloth is exposed to the atmosphere of coating fumes volatilized from the material in container 10. Preferably glass cloth 16 is held in reasonably close contact with the mouth of the container and the container length corresponds to the width of the glass cloth so that the cloth effectively covers the open top of the container. This minimizes escape of the iridizing fumes and causes them to permeate the glass cloth whereby an effective coating over the entire surface is more readily achieved. This also is effective in producing a more consistent electrical resistance in the filmed cloth. A thermocouple 24 is inserted underneath the glass cloth and in contact therewith as a means of determining the approximate temperature of the cloth as it is exposed to the coating fumes. The amount of heat supplied from heater 14 may then be either manually or automatically regulated in accordance with the temperatures indicated by thermocouple 24. While relatively thin materials of the type with which this invention is concerned are almost instantly brought to coating temperature, it will be appreciated that heating element 14 may be extended beyond the edge of coating chamber 10. Alternatively supplemental heating means may be provided to pre-heat the glass cloth or other material being passed through the coating chamber if this should be necessary or desirable for any reason.

It will be appreciated that a continuous sheet of thin flexible glass or other ceramic material might be substituted for glass cloth 16 and coated on its under surface by being continuously passed through the coating apparatus described above. Likewise individual glass sheets might be placed over the container mouth and coated in a stationary, batch type process.

Where narrow strips of material such as glass fiber tape or thin ribbons of glass on the order of an inch in width are to be coated it is convenient to substitute a coating unit such as shown in FIG. 2. This unit includes a container 26 provided with cover plates 28—28 which are spaced to provide an opening corresponding approximately to the width of the material being coated, in the present instance glass tape 30. This permits use of a container of such size that an adequate reservoir of coating material is maintained and facilitates heating the coating material, while at the same time restricting the volatilized coating fumes from escape without contacting the material being coated. Coil heater 34 provides heat to volatilize the coating material in container 26 and heating element 32 provides radiant heat to maintain tape 30 at coating temperature.

In some instances it may be desirable to use a closed type of container such as shown in FIG. 3 and designated by numeral 36. The end walls of container 36 are provided with slots 38 through which the material being coated, glass tape 40, may be passed. In this type of construction heater element 42 may serve in effect as a top or cover for the container and heater element 44 serves to volatilize the coating material in container 36.

In other instances it may be more desirable to support the base material over the source of radiant heat and coat the upper surface of the base material. This is particularly true where the material to be coated is in the form of individual sheets or the like.

FIG. 4 shows an apparatus designed for this type of coating. Glass sheet 46 is supported over a radiant heat source heater coil 48 and substantially covered by a manifold 50 which has an upper chamber 52 and lower chamber 54. The two chambers are separated by a dividing plate 56.

In this method of coating, fumes are fed into upper chamber 52 from an inlet tube 58. Alternatively, a mist may be introduced and vaporized in the hot manifold. In any event, a confined atmosphere of film forming vapors is formed in upper chamber 52 and spreads into chamber 54, as indicated. In this manner, the entire upper surface of glass sheet 46 is uniformly exposed to such circulating vapors without forcible or pressure impact on the glass sheet. Thus the film forming atmosphere is effectively quiescent and confined so that a film of substantially uniform physical and electrical characteristiccs is formed over the entire upper surface of glass sheet 46.

While the apparatus shown in FIG. 4 is particularly adaptable to batch or discontinuous type of coating, it is readily apparent that a continuous sheet of material might be drawn over heater 48 and suitably coated on its upper surface by maintaining an atmosphere of fumes in manifold 50.

By way of more specifically illustrating the invention, a roll of glass fiber cloth, commercially available from the Owens-Corning Fiber Glass Corporation and designated as #126 cloth, was coated in an apparatus substantially identical with that shown in FIG. 1. The cloth was several feet in length by 20½ inches wide by 0.005 inch thick. The coating atmosphere was produced by volatilizing a mixture of 99 parts by weight of $SnCl_4 \cdot 5H_2O$ and one part $SbCl_3$ and the cloth was drawn over the mouth of the container at a rate of 26.8 inches per minute with the coating solution being volatilized and consumed at a rate of 4.7 ounces per minute. During coating the glass cloth, as measured by a thermocouple, was maintained at a constant temperature of 550° C. After coating it was noted that the coating fumes had permeated the glass cloth and produced an oxide film over substantially the entire fiber surface, with the coated cloth having an electrical resistance at different points in its length within the range of 75–100 ohms per square. Such coated glass cloth may be used in the production of tape resistors, electrical shielding devices and semiflexible heating units.

The present invention has largely been described in terms of forming electrically conducting metal oxide coatings on thin base materials, since this appears to be its most valuable field of application. However it will be appreciated that it may also be used for applying protective metal oxide surface coatings and also for decorative and ornamental purposes where electrical conductivity is immaterial.

What is claimed is:

1. A method of producing an iridized metal oxide film on a thin vitreous substrate having a thickness not exceeding about 30 mils which comprises
    forming within a confined space an atmosphere of quiescent vapors containing at least one metal salt capable of decomposing in the presence of a heated surface and depositing on such surface a metal oxide corresponding to the metal salt,
    simultaneously
    (1) bringing said vapors into contact with an exposed surface of said vitreous substrate by thermal convection currents generated within the confined atmosphere, and
    (2) uniformly supplying radiant heat to the opposite surface of the substrate in an amount sufficient to compensate for the heat loss due to the formation of the metal oxide film on the exposed surface and to maintain the substrate at a substantially constant selected temperature, said selected constant temperature being at least 500° C., and below the softening temperature of said thin vitreous substrate thereby forming a metal oxide film of substantially uniform physical characteristics on the exposed surface of said thin vitreous substrate.

2. A method in accordance with claim 1 wherein the substrate is cloth woven from inorganic fibers.

3. A method in accordance with claim 1 wherein the substrate is a sheet of thin flexible glass.

4. A method for continuously producing an electrically conducting metal oxide film on an elongated strip of thin vitreous substrate material having a thickness not exceeding about 30 mils which comprises:
    forming within a walled container an atmosphere of quiescent vapors containing at least one metal salt capable of decomposing in the presence of a heated surface and depositing on such surface a metal oxide corresponding to the metal salt,
    heating the substrate to a selected coating temperature at which the metal salt decomposes to deposit the metal oxide,
    passing the heated substrate over the metal salt vapors and in close proximity to the container walls, and simultaneously
    (1) bringing the confined vapors into contact with the entire exposed under surface of the substrate by thermal convection currents generated within the confined atmosphere,
    (2) uniformly supplying radiant heat to the opposite surface of the thin vitreous substrate material in an amount sufficient to compensate for the heat loss due to the formation of the metal oxide film on the exposed surface and to maintain the substrate at a substantially constant selected temperature, said selected constant temperature being at least 500° C., and below the softening temperature of said thin vitreous substrate, thereby forming a metal oxide film of substantially uniform physical characteristics on the exposed surface of said substrate.

5. A method in accordance with claim 1 in which the temperature of the substrate is measured as the substrate passes over the film forming atmosphere and the amount of heat supplied is controlled in accordance therewith.

6. A method for producing an iridized metal oxide film on a strip of thin vitreous substrate material having a thickness not exceeding about 30 mils which comprises:
    introducing into one portion of a partially divided chamber to form therein a confined atmosphere of film forming vapor, a film forming material containing at least one metal salt capable of decomposing in the presence of a heated surface and depositing on such surface a metal oxide corresponding to the metal salt,
    heating the substrate strip to a selected coating temperature at which the metal salt decomposes to deposit the metal oxide, the heated substrate being located in a second portion of the divided chamber and out of direct communication with the point at which the film forming material is introduced in the first portion of the chamber, and
    simultaneously
    (1) circulating the film forming vapors over one surface of the heated substrate, by means of convection currents generated within the confined vapor containing atmosphere, and
    (2) uniformly supplying radiant heat to the opposite surface of the substrate in an amount sufficient to compensate for the heat loss due to the formation of the metal oxide film on the exposed surface and to maintain the substrate at a substantially constant selected temperature, said selected constant temperature being at least 500° C., and below the softening temperature of said thin vitreous substrate, thereby forming a metal oxide film of substantially uniform physical characteristics on the exposed surface of said thin vitreous substrate.

References Cited

UNITED STATES PATENTS

| | | | |
|---|---|---|---|
| 2,522,531 | 9/1950 | Mochel | 117—106 X |
| 2,566,346 | 9/1951 | Lytle et al. | 117—211 |
| 2,602,032 | 7/1952 | Gaiser | 117—106 X |
| 2,648,754 | 8/1953 | Lytle | 117—211 |
| 2,749,255 | 6/1956 | Nack et al. | 117—107.2 |
| 2,789,064 | 4/1957 | Schladitz | 117—107.2 |

ALFRED L. LEAVITT, *Primary Examiner.*

WILLIAM L. JARVIS, *Examiner.*

UNITED STATES PATENT OFFICE
CERTIFICATE OF CORRECTION

Patent No. 3,331,702                         July 18, 1967

Harold F. Dates et al.

It is hereby certified that error appears in the above numbered patent requiring correction and that the said Letters Patent should read as corrected below.

Column 2, line 70, for "each" read -- such --; column 3, line 70, for "500° C." read -- 550° C. --; column 4, line 4, after "entire" insert -- fiber --; column 6, line 23, for the claim reference numeral "1" read -- 4 --.

Signed and sealed this 20th day of August 1968.

(SEAL)
Attest:

Edward M. Fletcher, Jr.                          EDWARD J. BRENNER
Attesting Officer                                   Commissioner of Patents